(12) United States Patent
Takemoto

(10) Patent No.: US 6,615,254 B1
(45) Date of Patent: Sep. 2, 2003

(54) TERMINAL APPARATUS TO ENABLE USE OF AN INTERNET CONNECTION LINE

(75) Inventor: Makoto Takemoto, Osaka (JP)

(73) Assignee: Precision Medical Devices, Inc., Fort Lauderdale, FL (US)

( * ) Notice: Subject to any disclaimer, the term of this patent is extended or adjusted under 35 U.S.C. 154(b) by 0 days.

(21) Appl. No.: 09/488,823

(22) Filed: Jan. 21, 2000

(30) Foreign Application Priority Data

Jan. 21, 1999 (JP) .......................... P 11-012858

(51) Int. Cl.[7] .............................. G06F 13/00
(52) U.S. Cl. .................. 709/219; 709/217; 709/227; 709/203
(58) Field of Search ............... 709/202, 219, 709/221, 227, 228, 217; 713/200, 201, 202; 710/100, 101, 102, 103

(56) References Cited

U.S. PATENT DOCUMENTS

| | | | | |
|---|---|---|---|---|
| 5,901,284 A | * | 5/1999 | Hamdy-Swink | 713/200 |
| 5,978,919 A | * | 11/1999 | Doi et al. | 713/202 |
| 5,987,612 A | * | 11/1999 | Takagawa et al. | 713/201 |
| 6,230,267 B1 | * | 5/2001 | Richards et al. | 713/172 |
| 6,311,268 B1 | * | 10/2001 | Chu | 713/1 |
| 6,385,651 B2 | * | 5/2002 | Dancs et al. | 709/227 |
| 6,463,078 B1 | * | 10/2002 | Engstrom et al. | 370/466 |

FOREIGN PATENT DOCUMENTS

| | | |
|---|---|---|
| JP | 9-160972 | 6/1997 |
| JP | 9-231285 | 9/1997 |
| JP | 10-79733 | 3/1998 |

* cited by examiner

Primary Examiner—Robert B. Harrell
Assistant Examiner—Melvin H. Pollack

(57) ABSTRACT

A terminal apparatus for enabling the use of the Internet connection line. The terminal apparatus reads out the phone number of a first server and data for starting communication with the first server from an IC card mounted in the IC card socket, calls the phone number, and transmits the data in response to the demand from the first server. Moreover, the terminal apparatus receives the setting input by the setting acceptance screen for accepting the application for using the Internet connection line received from the first server, transmits the content to the first server, thereafter, demands the confirmation operation in response to the demand from the first server, and when it receives the confirmation input, advises the same. Furthermore, the terminal apparatus receives advice of the phone number of a second server, and the user ID and the password for starting communication with the second server from the first server, and stores the same in the IC card.

3 Claims, 4 Drawing Sheets

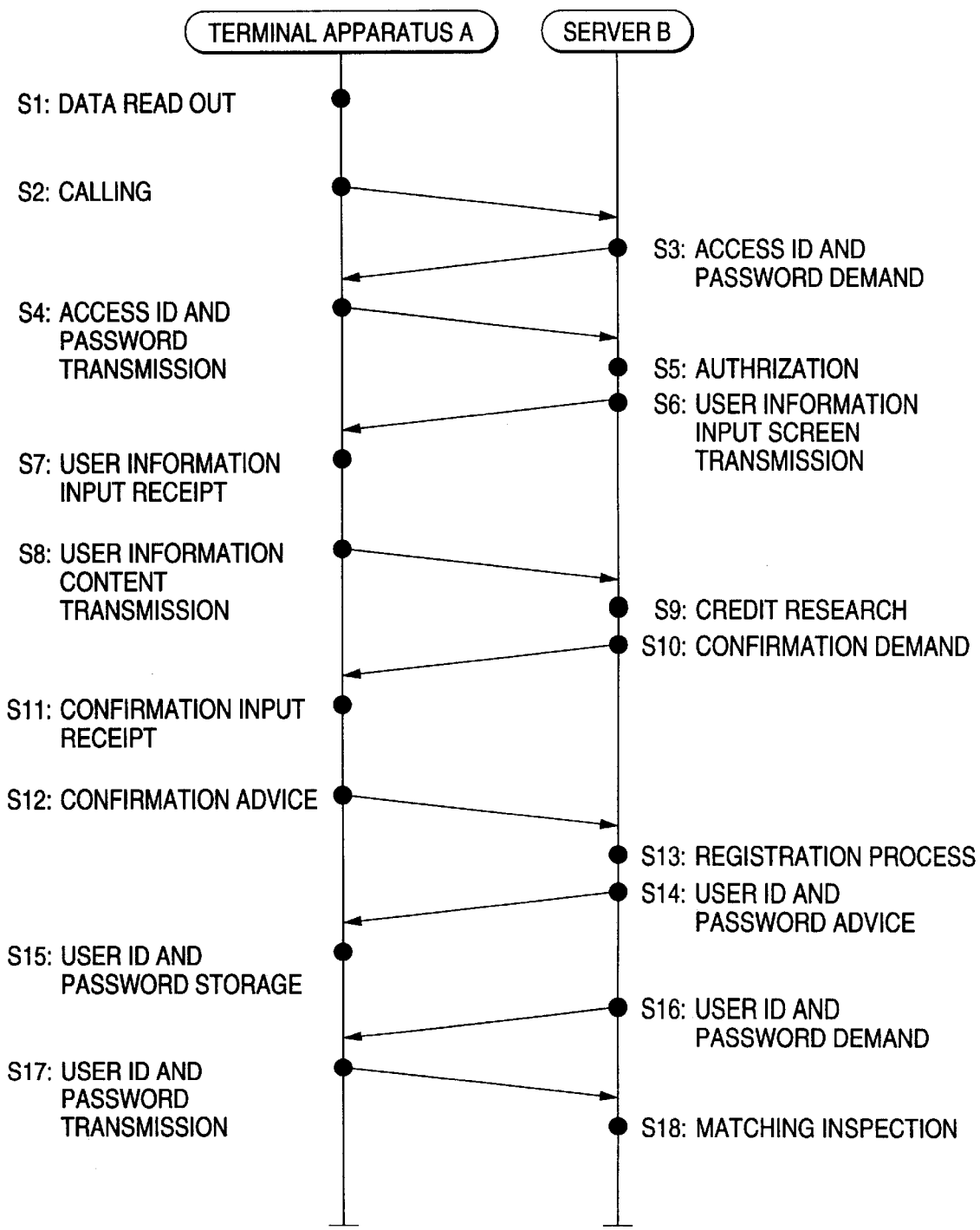

TERMINAL APPARATUS TO ENABLE USE OF AN INTERNET CONNECTION LINE

BACKGROUND OF THE INVENTION

1. Field of the Invention

The present invention relates to a terminal apparatus for enabling the use of the Internet connection line, and in particular, it relates to a terminal apparatus unique in the procedure and operation for applying for the use of the Internet connection line.

2. Description of the Related Art

The Internet is the computer network wherein a large number of computers are connected worldwide. Each computer has various kinds of information to be read out from the other computers, such as home pages, e-mails, and various kinds of programs, stored therein.

A home page corresponds to the cover page or the index of a combination of information. That is, by selecting a picture (icon) or a character string on the display screen of the home page, information preliminarily linked therewith, specifically, document information, image information such as a static image and a video image, or sound information can be accessed.

A user can read the information freely by operating a computer connected with the Internet. Furthermore, the user can take the information into the computer he or she operates (download) as needed.

In general, in order to establish the operation environment capable of reading a home page, or transmitting or receiving an e-mail, that is, an Internet utilizing environment, one should purchase a computer and necessary peripheral devices, besides, in order to operate the same normally, a certain degree of knowledge on the computer is required.

Therefore, the Internet utilizing environment has been remote to those who are not accustomed to the computer operation. Furthermore, operation of inputting means peculiar to a computer, such as a mouse and a key board, gives the impression to those people that it is unapproachable.

In light of the background, recently, manufacturers provide terminal apparatus capable of establishing the Internet utilizing environment only with television sets and telephone lines available in ordinary households without the need of purchasing a computer and peripheral devices.

Moreover, the manufacturers expect the use in the households by enabling all the operations in the terminal apparatus with buttons of the remote controller thereof for the sake of the users unaccustomed with the computer operation.

An authorization method and an authorization system using an IC card disclosed in Japanese Patent Unexamined Publication No. Hei. 10-79733 provides a configuration capable of cutting down the calculation amount for the user authorization. An object thereof is to achieve a high speed process by authorization based on the authorization information stored commonly in the user terminal without the need of a calculation process for the authorization in the IC card for communication with a partner in a certain time after the user executes authorization with the partner using an IC card.

Moreover, a multi-media home electronic settlement terminal apparatus disclosed in Japanese Patent Unexamined Publication No. Hei. 9-231285 relates to commercial transaction using a network. An object thereof is to provide a home terminal for enabling virtual shopping.

Furthermore, Japanese Patent Unexamined Publication No. Hei. 9-160972 discloses an electronic commercial transaction system. An object thereof is to provide an open electronic commercial transaction system for realizing on-line shopping with the confidence ensured.

Incidentally, for starting the use of the Internet utilizing environment, the contract procedure with an Internet service provides (hereinafter referred to as ISP) and the initial setting operation are required either in the case of the operation environment using a computer or the case of the operation environment using the terminal apparatus. A certain degree of knowledge on the computer is required for the procedure and the operation.

That is, a problem arises in that although the operation environment using the terminal apparatus should be available regardless of the degree of the knowledge on the computer, the consideration for realizing the same is insufficient.

Moreover, there is a risk of a wrong setting in the initial setting operation to be executed by hand. In this case, a great burden is required until the normal setting is achieved.

SUMMARY OF THE INVENTION

In light of the above circumstances, an object of the invention is to provide a terminal apparatus capable of simplifying the contract procedure with an ISP, and reducing the burden of the initial setting operation for establishing the Internet utilizing environment.

In order to achieve the above object, according to the invention, there is provided a terminal apparatus connected with a server computer via a communication line for calling a preset phone number of the server computer, and transmitting preset information to a callee so as to receive a use permit of a communication network connection line for enabling the use of the communication network connection line, comprising: a socket for detachably mounting a memory medium; means for reading out a phone number of a first server computer and information for starting communication with the first server computer from the memory medium mounted on the socket; means for calling the read out phone number of the first server computer; means for transmitting the read out information for starting communication with the first server computer to the callee in response to demand from the callee; means for receiving setting input for applying for the use of a communication network connection line connected with a second server computer and transmitting the content to the callee in response to demand from the callee; and means for receiving a phone number of the second server computer and information for receiving a use permit of the communication network connection line from the callee, and storing the same in the memory medium.

BRIEF DESCRIPTION OF THE DRAWINGS

FIG. 4 is a sequence chart for explaining the operation sequence of the terminal apparatus according to the invention.

DETAILED DESCRIPTION OF THE PREFERRED EMBODIMENT

Figure 3:
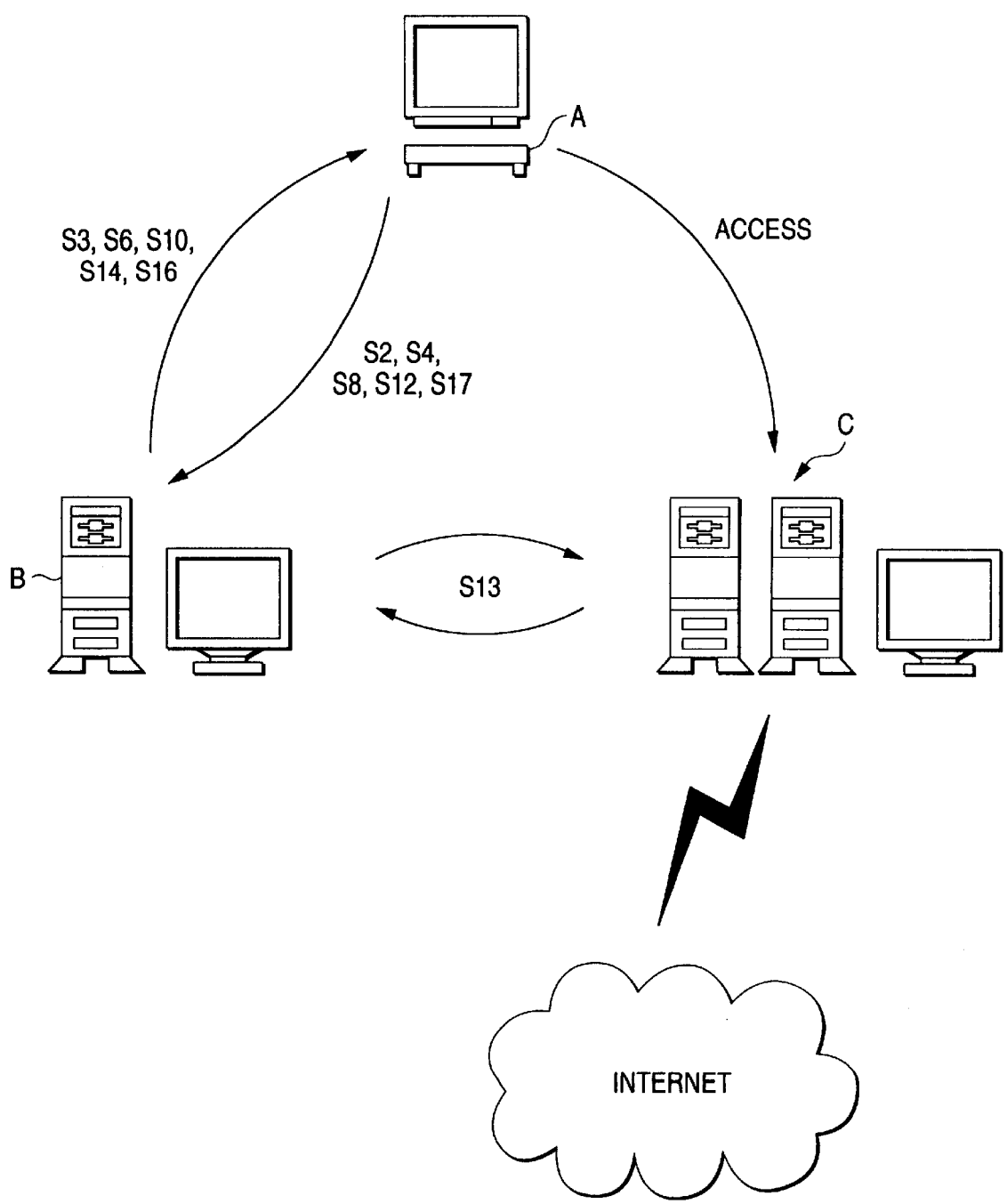
FIG. 3 is a diagram for explaining the concept of the terminal apparatus according to the invention.

FIG. 3 is a diagram for explaining the concept of a terminal apparatus according to the invention. FIG. 4 is a sequence chart for explaining the operation sequence of the terminal apparatus according to the invention. At first, the concept of the invention will be explained with reference to FIGS. 3 and 4.

In FIG. 3, A designates a terminal apparatus according to the invention, provided with an IC card socket (not illustrated). B designates a server computer (hereinafter referred to as server) for accepting the contract procedure, and C designates a server administered by an ISP.

When the power source is switched on, the terminal apparatus A reads out the phone number of the server B and data for starting communication with the server B, specifically, the access ID and the password from an IC card mounted in the IC card socket thereof (S1) and calls the phone number (S2). Subject to the receipt of the phone number, the server B demands transmission of the access ID and the password (S3).

In response to the demand from the server B, the terminal apparatus A transmits the access ID and the password (S4). When the server B authorizes the received access ID and password for confirmation of the registered user (S5), it transmits a user information input screen for accepting the use application of the Internet connection line (S6). The terminal apparatus A receives the user information input by the received user information input screen (S7), and transmits the content thereof to the server B (S8). The server B executes the credit research for the received setting content (S9). Specifically, whether or not the limit amount of the credit card to be used for the payment of the use fee of the Internet connection line is sufficient is researched, and in the case it meets a predetermined standard, the server B demands the confirmation of the contract (S10).

In response to the demand from the server B, the terminal apparatus A requires the confirmation operation, and when it receives the input for the confirmation (S11), it advises the same (S12). When the server B receives the confirmation advice, it executes the user registration procedure to the server C, and when it receives issuance of the user ID for starting communication with the server C and the password corresponding thereto (S13), it advises the same and the phone number of the server C to the terminal apparatus A (S14). The terminal apparatus A receives the advice of the user ID, the password and the phone number and stores the same in the IC card (S15).

Moreover, the server B demands transmission of the user ID and the password after a certain period from completing the advice in S14 (S16). In response to the demand from the server B, the terminal apparatus A reads out the user ID and the password, and transmits the same (S17). The server B executes the matching inspection for the received user ID and the password, and when they are matched, the process is terminated (S18).

In S18, by overwriting the phone number of the server C and the data for starting communication with the server C on the phone number of the server B and the data for starting communication with the server B, access thereafter is executed with the server C so that the Internet connection line can be used.

As heretofore described, according to the invention, a user can establish the Internet utilizing environment only by mounting an IC card in the IC card socket, switching on the power source, and executing the input setting for the use application of an Internet connection line.

Moreover, the operation of inputting the phone number, the user ID and the password can be omitted in the initial setting operation.

Figure 1:
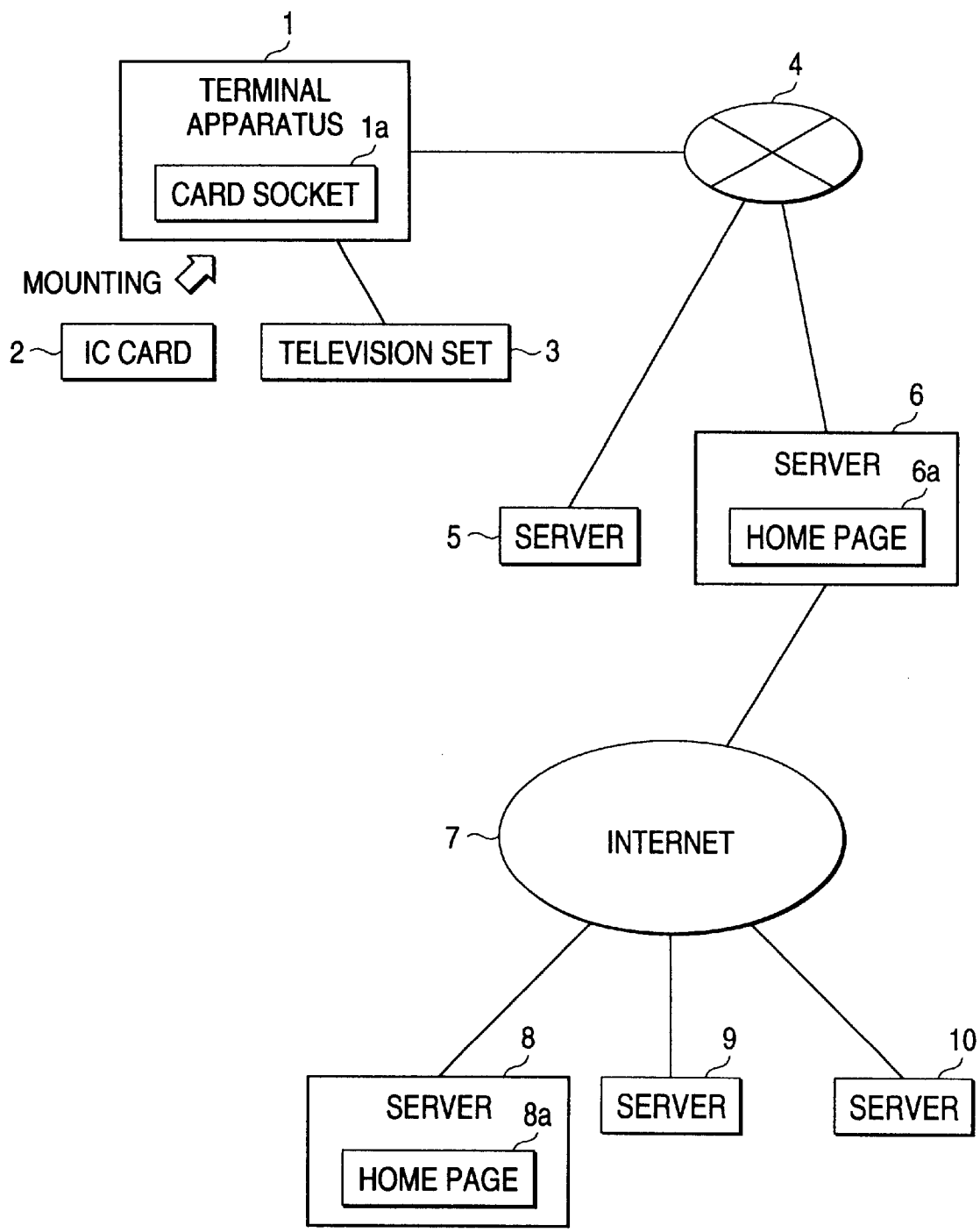
FIG. 1 is a block diagram for explaining the configuration of a terminal apparatus according to the invention.

FIG. 1 is a block diagram for explaining the configuration of a terminal apparatus according to the invention. In the figure, a terminal apparatus 1 comprises a card socket 1a for detachably mounting an IC card 2. Moreover, the terminal apparatus 1 is provided with output terminals for outputting video signals and audio signals each connected with corresponding input terminal of a television set 3. Furthermore, the terminal apparatus 1 is provided with a communication line connection terminal connected with a public line 4.

On the other hand, a server 5 for accepting the contract procedure and a server 6 administered by an ISP are connected with the public line 4 so that both can communicate with each other. A home page 6a is stored in the server 6. Moreover, the server 6 is connected with the Internet 7. Servers 8, 9 and 10 similar to the server 6 are connected with the Internet 7. A home page 8a is stored in the server 8.

Figure 2:
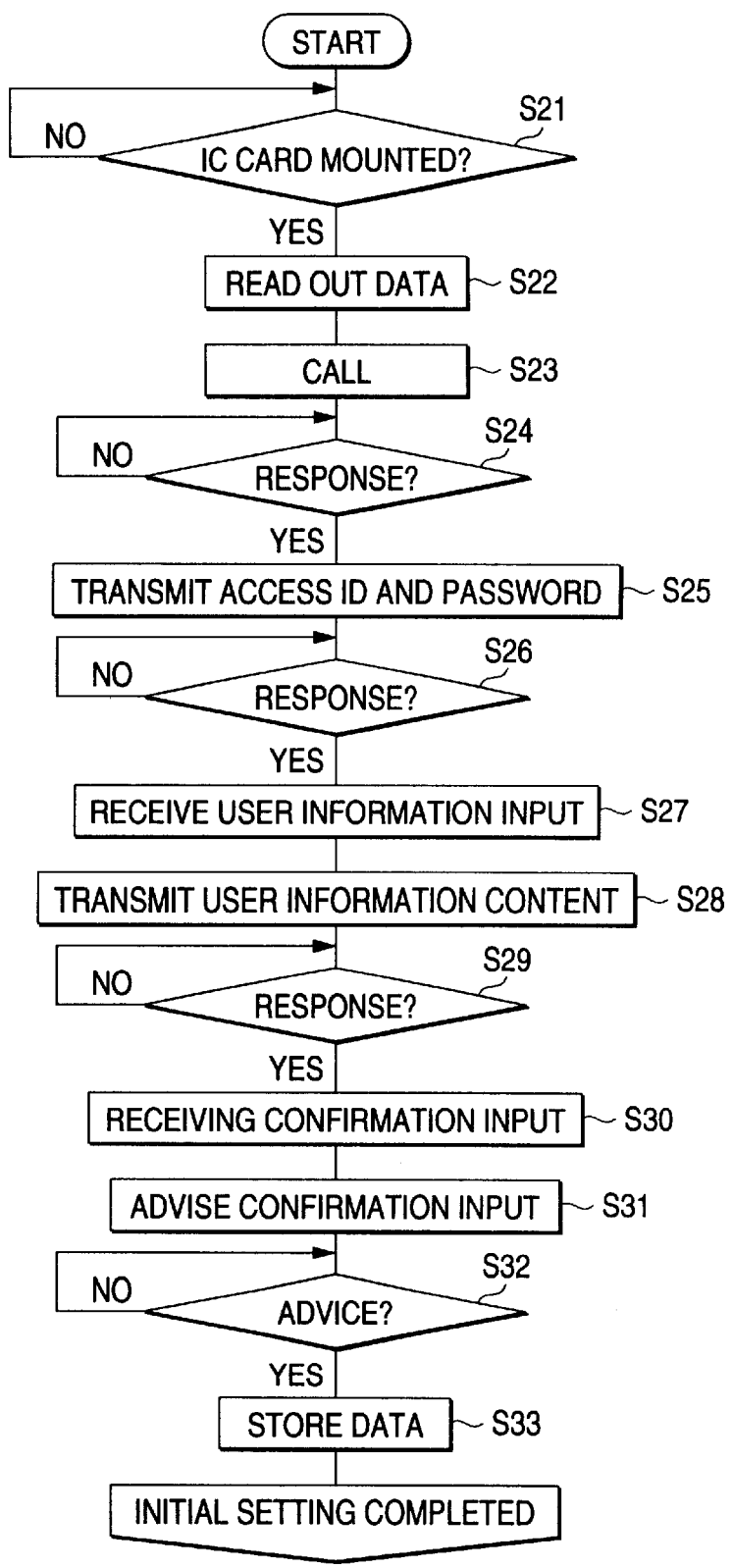
FIG. 2 is a flow chart showing the operation procedure of the terminal apparatus according to the invention.

FIG. 2 is a flow chart showing the operation procedure of the terminal apparatus. When the power source is switched on, the terminal apparatus A judges whether or not the IC card 2 is mounted (S21), and repeats the operation until it is judged to be mounted. When it is judged to be mounted, the terminal apparatus A reads out the phone number of the server 5 and the data for starting communication with the server 5, specifically the access ID and the password from the IC card 2 (S22), and calls the phone number (S23). Thereafter, it judges whether or not there is a response from the server 5 (S24), and repeats the operation until the response is judged to be there.

When the response from the server 5 is judged to be there, the apparatus transmits the access ID and the password to the server 5 (S25). Thereafter, it judges whether or not there is a response from the server 5 (S26), and repeats the operation until the response is judged to be there.

When the response from the server 5 is judged to be there, it displays a user information input screen for receiving the user information input (S27), and transmits the content thereof to the server 5 (S28). Here, the Internet connection line connected with the server 6 is assumed to be set. Thereafter, it judges whether or not there is a response from the server 5 (S29), and repeats the operation until the response is judged to be there.

When the response from the server 5 is judged to be there, it displays a confirmation input screen for receiving the confirmation input (S30), and advises the same to the server 5 (S31). Thereafter, it judges whether or not there is an advice of the phone number of the server 6 and data for starting communication with the server 6, specifically, the user ID and the password from the server 5 (S32), and repeats the operation until the advice is judged to be there.

When an advice from the server 5 is judged to be there, it stores the received phone number, user ID and password in the IC card 2 (S33).

According to the process procedure described above, since the necessary data for using the Internet connection line connected with the server 6 are stored in the IC card 2, thereafter the Internet utilizing environment can be used by mounting the IC card 2 in the card socket 1a of the terminal apparatus 1 and switching on the power source.

Although establishment of the Internet utilizing environment has been described in the above embodiment, it is needless to say that the invention can be implemented similarly for establishment of an intranet operating environment.

According to the terminal apparatus of the invention as described above, since the Internet utilizing environment can be established only by mounting an IC card in the IC card socket, switching on the power source, and executing the setting input for applying for the use of the Internet connection line, the excellent effect can be achieved in cutting back the burden in the initial setting operation.

Moreover, according to the terminal apparatus of the invention, since the operation for inputting the phone number, the user ID and the password to be executed by the user in the initial setting operation can be omitted, there is no risk of a wrong setting, and thus the excellent effect can be achieved in cutting back the burden in the initial setting operation.

What is claimed is:

1. A terminal apparatus connected with a server computer via a communication line for calling a preset phone number of the server computer B, and transmitting preset information to a callee so as to receive a use permit of a communication network connection line for enabling the use of the communication network connection line, comprising:

a socket for detachably mounting a memory medium;

means for reading out a phone number of a first server computer and information for starting communication with the first server computer from the memory medium mounted on the socket; means for calling the read out phone number of the first server computer;

means for transmitting the read out information for starting communication with the first server computer to the callee in response to demand from the callee;

means for receiving setting input for applying for the use of a communication network connection line connected with a second server computer and transmitting a content of the setting input to the callee in response to demand from the callee;

means for independently verifying the content of the setting input; and means for receiving a phone number of the second server computer and information for receiving a use permit of the communication network connection line from the callee, and storing the same in the memory medium.

2. The terminal apparatus according to claim 1, wherein the memory medium is an IC card.

3. The terminal apparatus according to claim 1, wherein the communication network connection line is the Internet connection line.

* * * * *

UNITED STATES PATENT AND TRADEMARK OFFICE
CERTIFICATE OF CORRECTION

PATENT NO. : 6,615,254 B1
DATED : September 2, 2003
INVENTOR(S) : Makoto Takemoto It is certified that error appears in the above-identified patent and that said Letters Patent is hereby corrected as shown below:

<u>Title page,</u>
Item [73], please correct the Assignee's information as follows:

-- [73] Assignee: Funai Electric Co., Ltd.
　　　　　　　　Daito-shi, Japan --

Please add the *Attorney, Agent or Firm* information as follows:

-- [74] *Attorney, Agent, or Firm*-Crowell & Moring LLP --

Signed and Sealed this

Tenth Day of August, 2004

JON W. DUDAS
*Acting Director of the United States Patent and Trademark Office*